No. 819,865. PATENTED MAY 8, 1906.
A. S. DENNIS.
COMBINED NUMBER RECORDING AND ADDING MACHINE.
APPLICATION FILED SEPT. 19, 1904.

7 SHEETS—SHEET 1.

WITNESSES:

INVENTOR.
Adolphus S. Dennis
BY H J Fisher
ATTORNEY.

No. 819,865. PATENTED MAY 8, 1906.
A. S. DENNIS.
COMBINED NUMBER RECORDING AND ADDING MACHINE.
APPLICATION FILED SEPT. 19, 1904.
7 SHEETS—SHEET 2.
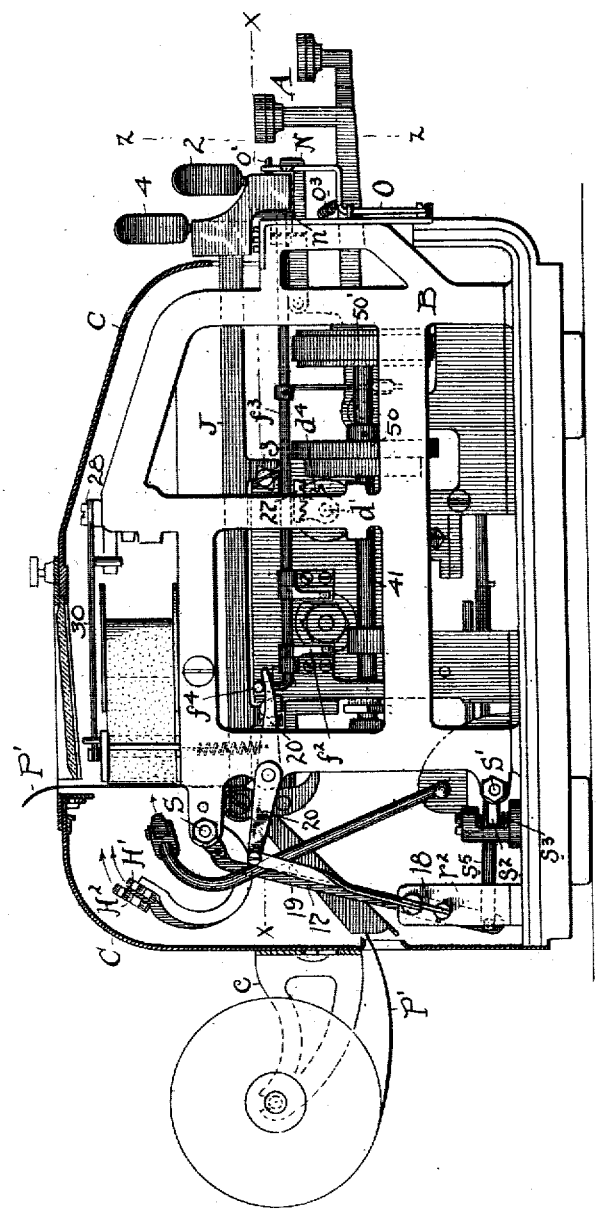
WITNESSES:
INVENTOR.
Adolphus S. Dennis.
BY H. J. Fisher
ATTORNEY.

No. 819,865. PATENTED MAY 8, 1906.
A. S. DENNIS.
COMBINED NUMBER RECORDING AND ADDING MACHINE.
APPLICATION FILED SEPT. 19, 1904.
7 SHEETS—SHEET 3.
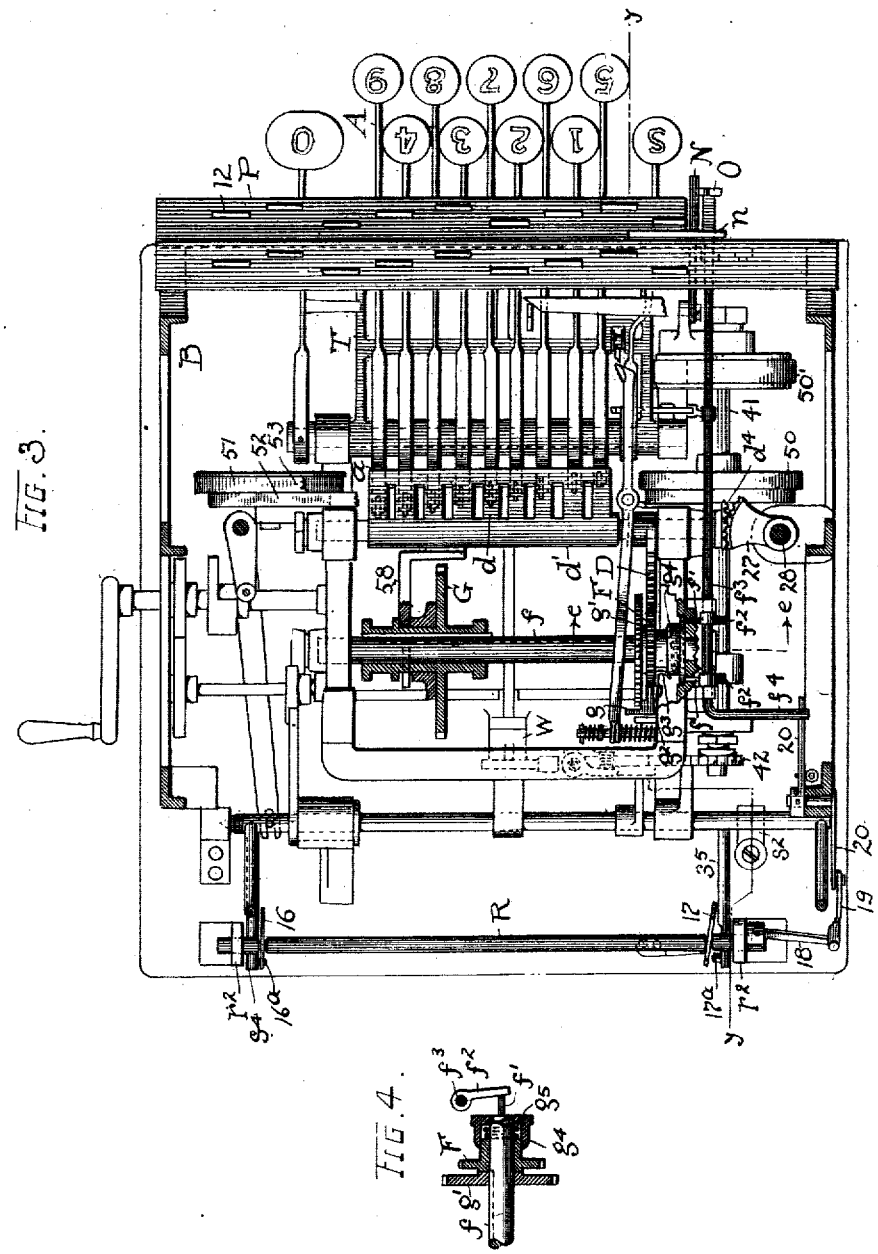
WITNESSES:
INVENTOR.
Adolphus S. Dennis
BY H J Fisher
ATTORNEY.

No. 819,865. PATENTED MAY 8, 1906.
A. S. DENNIS.
COMBINED NUMBER RECORDING AND ADDING MACHINE.
APPLICATION FILED SEPT. 19, 1904.

7 SHEETS—SHEET 4.

WITNESSES: INVENTOR.
Adolphus S. Dennis
BY H. J. Fröhli
ATTORNEY.

No. 819,865. PATENTED MAY 8, 1906.
A. S. DENNIS.
COMBINED NUMBER RECORDING AND ADDING MACHINE.
APPLICATION FILED SEPT. 19, 1904.
7 SHEETS—SHEET 5.
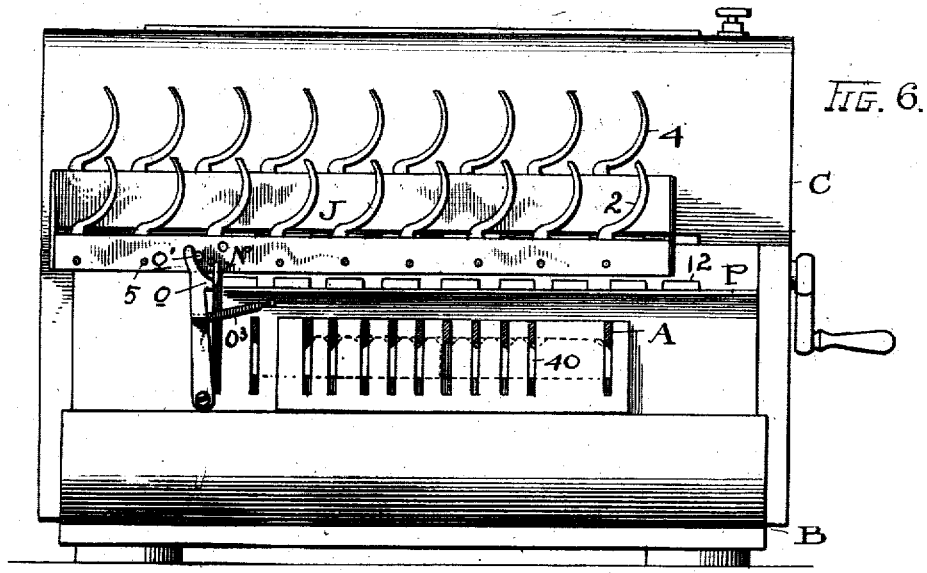
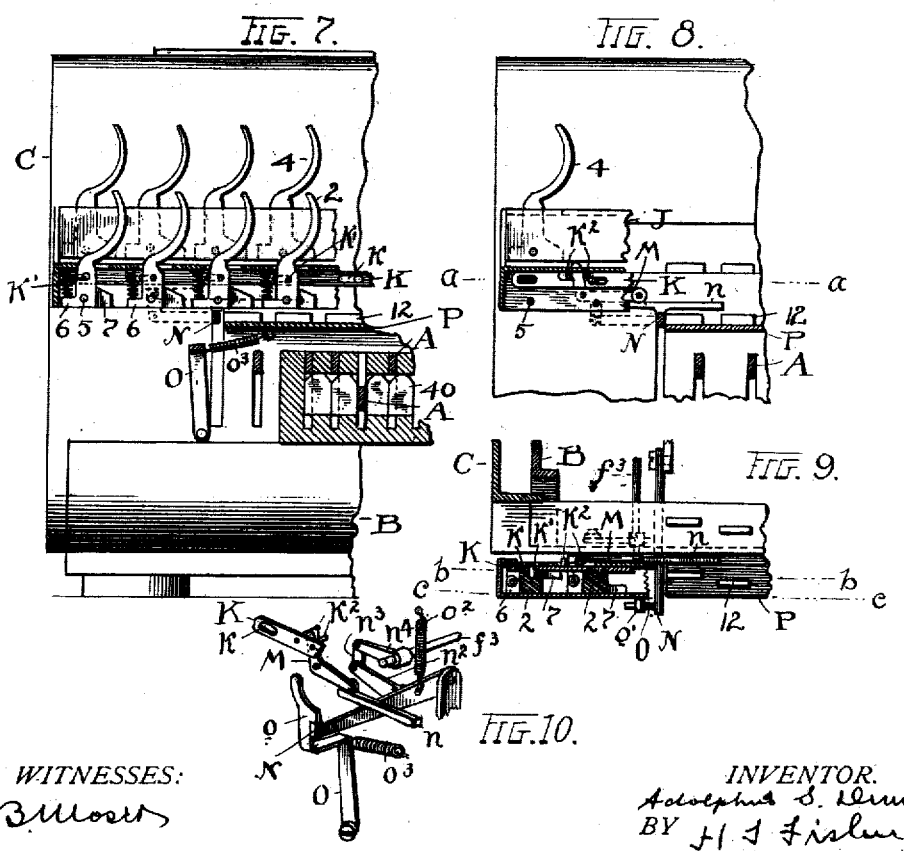
WITNESSES:
INVENTOR.
Adolphus S. Dennis
BY H. J. Fisher
ATTORNEY.

No. 819,865. PATENTED MAY 8, 1906.
A. S. DENNIS.
COMBINED NUMBER RECORDING AND ADDING MACHINE.
APPLICATION FILED SEPT. 19, 1904.
7 SHEETS—SHEET 6.
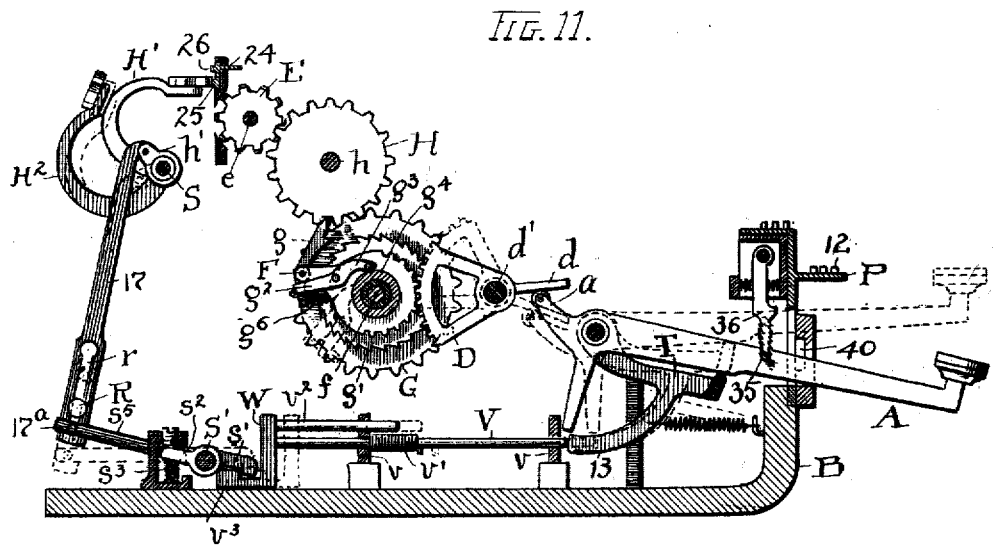
WITNESSES:
INVENTOR.
Adolphus S. Dennis.
BY H. J. Fisher
ATTORNEY.

No. 819,865. PATENTED MAY 8, 1906.
A. S. DENNIS.
COMBINED NUMBER RECORDING AND ADDING MACHINE.
APPLICATION FILED SEPT. 19, 1904.

7 SHEETS—SHEET 7.

WITNESSES

INVENTOR.
Adolphus S. Dennis
By H. J. Fisher ATTY

UNITED STATES PATENT OFFICE.

ADOLPHUS S. DENNIS, OF CLEVELAND, OHIO, ASSIGNOR, BY MESNE ASSIGNMENTS, TO THE NATIONAL ADDING MACHINE COMPANY, OF CLEVELAND, OHIO, A CORPORATION OF OHIO.

COMBINED NUMBER RECORDING AND ADDING MACHINE.

No. 819,865.     Specification of Letters Patent.     Patented May 8, 1906.

Application filed September 19, 1904. Serial No. 225,079.

*To all whom it may concern:*

Be it known that I, ADOLPHUS S. DENNIS, a citizen of the United States, residing at Cleveland, in the county of Cuyahoga and State of Ohio, have invented certain new and useful Improvements in a Combined Number Recording and Adding Machine; and I do declare that the following is a full, clear, and exact description of the invention, which will enable others skilled in the art to which it appertains to make and use the same.

My invention relates to a combined number recording and adding machine; and the invention consists in a machine constructed and adapted to operate substantially as shown and described, and particularly pointed out in the claims.

Figure 1:
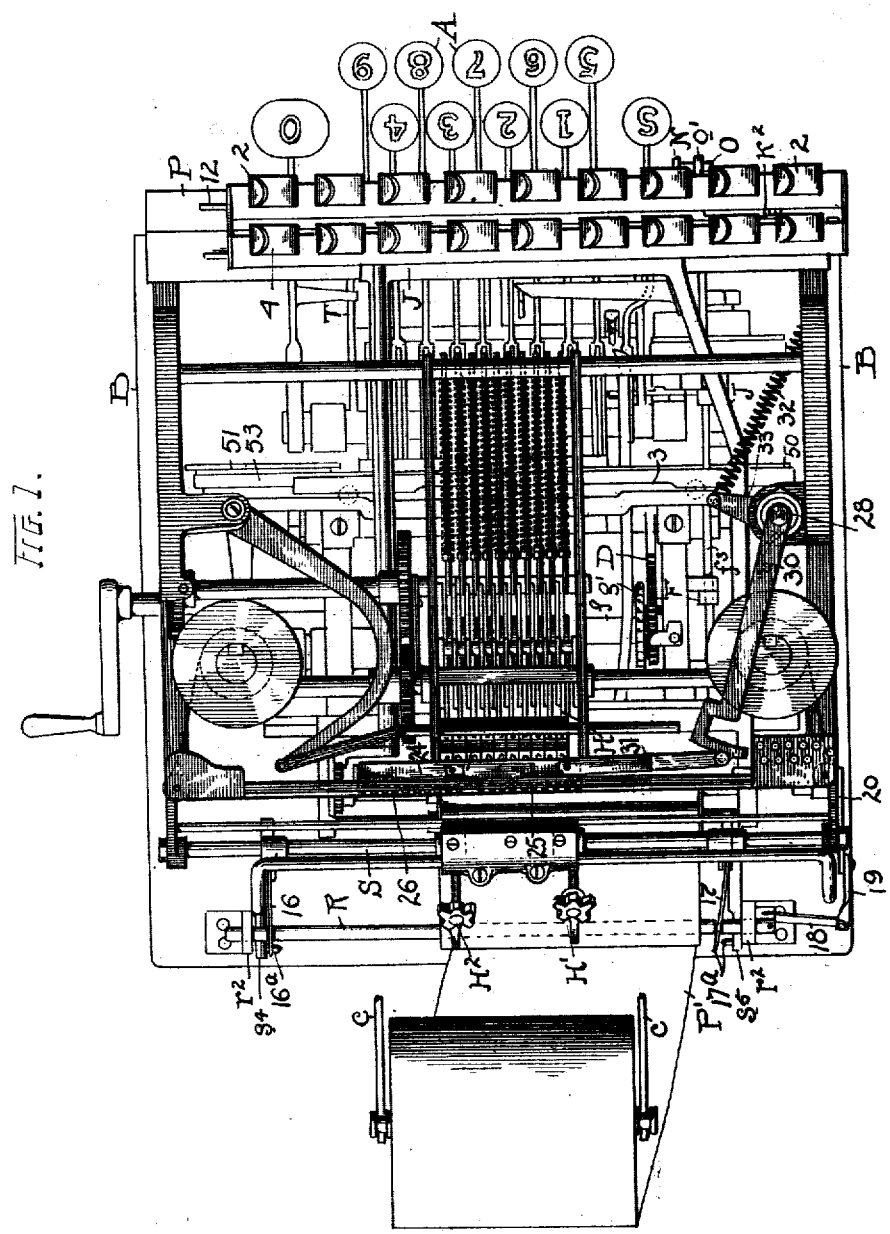
Figure 5:
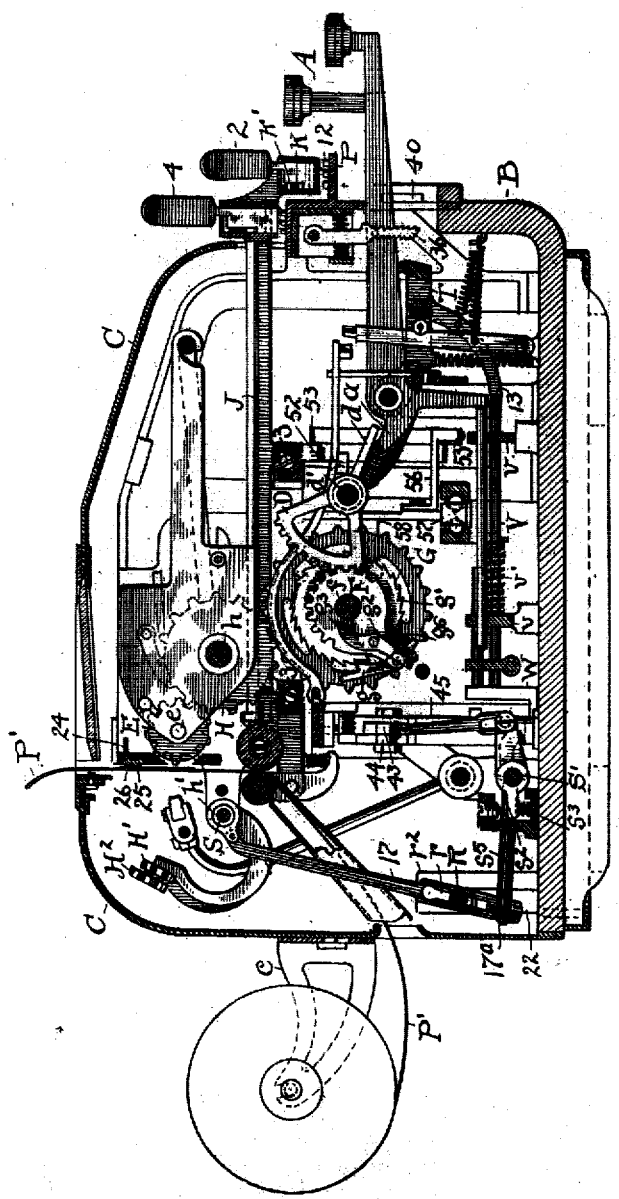
Figure 16:
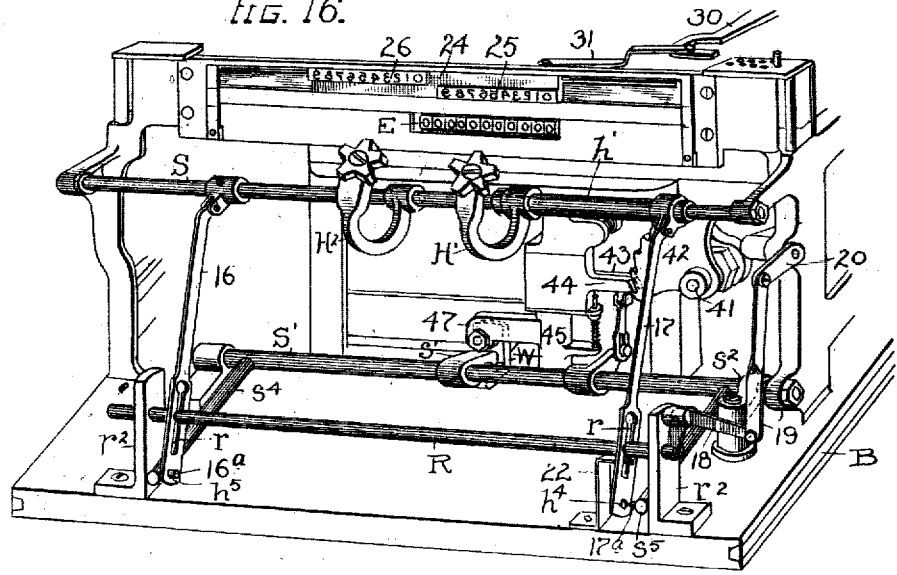
Figure 17:
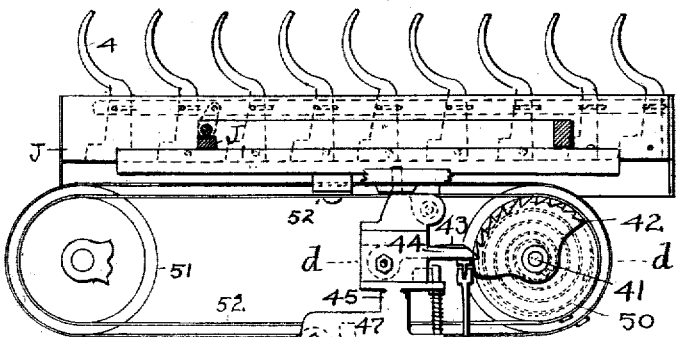
Figure 19:
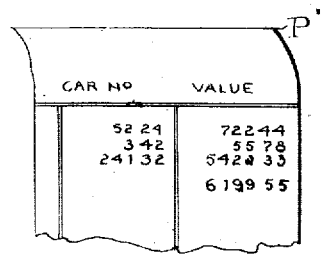
Figure 18:
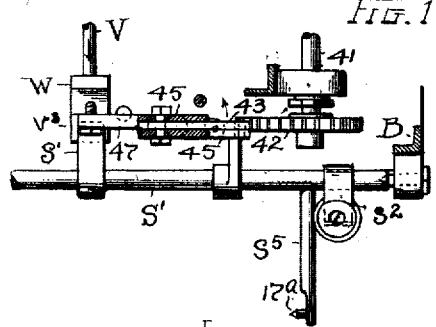

In the accompanying drawings, Figure 1 is a plan view of the machine with the outer casing or cover removed. Fig. 2 is a side elevation of the machine with the casing on and in section. Fig. 3 is a horizontal sectional plan view on a line corresponding substantially to $xx$, Fig. 2. Fig. 4 is a sectional detail on line $ee$, Fig. 3. Fig. 5 is a vertical sectional elevation of the entire machine on a line corresponding to $yy$, Fig. 3. Fig. 6 is a front view of the machine in which the key-levers are sectioned away. Fig. 7 is an elevation, partly in section on a line corresponding to $cc$, Fig. 9. Fig. 8 is an elevation, partly in section on a line corresponding to $bb$, Fig. 9; and Fig. 9 is a sectional view on a line corresponding to $aa$, Fig. 8. Fig. 10 is a perspective detail of a group of operating parts, as hereinafter fully described. Fig. 11 is an elevation of a line of mechanism running through the machine from front to rear and illustrating the actuation of one of the hammer-arms from the corresponding key-lever and the throw-out for the adding mechanism. Figs. 12, 13, 14, and 15 cover details for controlling the depression of the key-levers, as hereinafter fully described. Fig. 16 is a perspective view of the rear of the machine and certain of the operating parts thereon. Fig. 17 is a diagrammatic view of certain of the operating features, as hereinafter fully described. Fig. 18 is a cross-section on line $dd$, Fig. 17. Fig. 19 is a view of a piece of paper upon which imprint by the machine has been made.

In the machine as thus shown the essential novelty lies in the means whereby the numbers of the articles of which a record is to be made are written in the same line and consecutively with the values thereof in a parallel vertical column and in the combination therewith of the adding mechanism—that is, the adding and totalizing mechanism in this machine is not in itself a wholly new embodiment, but is contained more or less fully in other applications for Letters Patent hitherto made by me; but the mechanism for writing the numbers, say, of the cars of a railroad company or of any other article and for any other purpose, as in the left-hand column, Fig. 19, and the conjoint action thereof with the mechanism which prints, adds, and records aggregates or answers, as at the right in Fig. 19, is new and original with me. In this connection it is to be noted that the numbers of each car is first written and then the value thereof at the right, and I may limit the action to the writing of numbers or to the recording of values and adding, and each column may stand for and be expressive of anything for which characters may stand, whether of numbers or values or anything else which may be written in this way. In this description, however, the first column is given as car-numbers and the second column to values in dollars and cents.

Now proceeding with the machine as shown, A represents the key-levers, and B the base or body on which all the mechanism rests, directly or indirectly, and C the removable casing. The casing may be lifted off bodily, but is not intended to be when the machine is in use, and is provided at its rear with brackets $c$ to carry the paper or paper-roll on which the imprint is made, a portion of which is seen in Fig. 19.

The machine has the usual number of key-levers, corresponding to the number of characters used, and provided with inner roller extremities $a$, engaging beneath the wing or plate $d$, rigid with and controlling the rocking segment D on cross-shaft $d'$, all as in Fig. 5. The extensions or extremities $a$ of the key-levers vary in length, according to their relative values from "1" to "9," the latter being longest of all and giving the greatest throw to segment D and the mechanism operated thereby, as through plate d. The measure or limit of the throw thus put into action, large or small, continues to the end of the train of mechanism in line therewith and includes the totalizing-disks E, of which there are ten shown in this instance side by side on a shaft e and separately rotatable; but these and the associated adding and totalizing mechanism is not especially of this invention, and therefore is not more minutely described. Segment D reaches armed sector F, free on shaft f, and the wheels H on shaft h, according to the one chosen by gear G, and engaging the corresponding type wheel or disk E, according to the item to be written. Thus supposing the item to be "1904," the machine is set to begin writing in the fourth column, and then as the successive keys for the other figures of the item, "9" "0" "4," are struck the selector-wheel G moves over one column each time; but the degree of its rotation depends on the value or size of the figure to be added in. A pawl g is shown in Fig. 11 and is adapted to engage ratchet-wheel g', splined on shaft f and used when adding values, but is automatically thrown out, as shown, when writing car-numbers or the like occurs. The said pawl is controlled as to either position through arm g², pivoted on sector F and provided with a right-angled extension g³, engaged upon the sleeve or collar g⁴, Fig. 4, over the outer end of shaft f and which is mounted to slide on the hub of sector F and is provided with pins f', engaged by short arm f² on oscillating or rocking shaft f³ when the carriage for the counting of the cars is actuated, as will be hereinafter seen. Then the short arm f² is thrown inward, and collar g⁴ presses against its contained spring g⁵ and causes arm g² to lift pawl g out of engagement with ratchet g'. Then as pressure against collar g⁴ is withdrawn its spring throws it outward and pawl g is permitted to drop again into working position to connect the line of adding mechanism, as before. The arm g² has a right-angled portion engaging pawl g below to depress that end, and a spring g⁶ throws the pawl back into action, Fig. 5.

Two distinct and separate lines of mechanism are used for the two purposes of recording numbers and adding amounts or items, and each line has its own series of separate selector-keys 2 and 4, respectively, at the front of the machine in rows one behind and above, the other next behind, the key-levers and mounted alike upon or in the carriage J. Said carriage lies centrally in the machine and has free course of travel right and left between the sides of the machine on antifriction roller-bearings 3 and without obstruction from other parts. The skeleton or framework of said carriage is seen in part in several figures and has a step-by-step movement from right to left under actuation by key-levers A. The pivoted keys 2 and 4 fix the starting place or column—such as units, tens, hundreds, and the like—and the carriage is moved over toward the right in any case by pressing the key corresponding to the first figure in a number to be recorded, whether it be in the tens, hundreds, or other column. If there be two figures in the item, the second lever in the 2 or 4 line at the right is pressed and the printing will begin in tens-column. If the item be, say, "1,000," the fifth lever in proper line 2 or 4 is pressed and the carriage moves over just that far and no farther, and then printing begins in the thousands-column. Furthermore, the operation of the suitable lower key 2 sets the mechanism for the recording of the car-number and suspends the other line of mechanism for adding, and having written or recorded this item the carriage is set by the appropriate selecting-key 4 in the upper series for the adding mechanism and the line of counting mechanism is correspondingly suspended. Each line of mechanism has its own hammer H' and H², respectively, at the rear of the machine, as will be seen farther along.

Now following first the line for writing the car-numbers as it involves the carriage J, it will be seen that as any selecting-key 2 is pressed back or to the right it swings within limits on its pivot 5 and actuates the laterally-movable lever N, Figs. 6 and 15, through which the pawl g, heretofore described, is thrown out, as in Fig. 11. This disconnects or breaks the adding line of mechanism and allows the car-numbers to be recorded by depressing the corresponding key-levers A and actuating the hammer H'. Each key 2 has a spring-pressed toe 6 at one side of its pivot to hold it in normal position and a heel 7 on the other side adapted to engage a stop 12, designed for it on the plate P, and these stops are staggered and there is one for each key. Each key strikes none but its own stop, which stops the carriage. The units begin at the right in this line, so that to engage, say, the third stop 2 from the right of the machine moves the carriage to the hundreds-column for writing the car-numbers and suspends the adding-line automatically through lever N. Each key-lever 2 also has a pin k' working in a slot k in transverse bar K, and this bar has pins k² engaging an arm of bell-crank lever M, which bears on a cross-piece n on lever N and depresses said lever when any one of keys 2 is operated. Pivoted spring-retracted lever O has a catch o for lever N, and the moment said lever is depressed by carrying bar K to the right the said catch engages over lever N, and the rear pawl g is raised out of engagement and adding is interrupted; but as soon as the car-numbers are written the carriage itself releases arm N by pressing the lever O from over the same, a pin or lug o' being placed on the carriage for this purpose.

This change occurs as the carriage reaches its limit of travel to the left and can go no farther that way.

Now following the mechanism from lever N to pawl g, it is seen that said lever has a rigid finger n² at right angles, Fig. 10, connected by link n³ with arm n⁴ on rock-shaft f², which runs to the rear of the machine on a plane just beneath the roller-bearings for carriage J, Fig. 2. This shaft has two depending arms f², fixed thereon and bearing against the pins f' on collar g⁴, Fig. 4, as hereinbefore described, and serving to lift pawl g out of engagement with ratchet-wheel g'. A spring o² at the front holds lever N in its raised position normally, and spring o³ holds lever O in its normal position.

Having the carriage and other parts as just described in position for printing the car-numbers, the way is also clear to strike the hammer H' and make the impressions or imprints on the paper P' at the left of the adding-column, as in Fig. 19, and this is done primarily by striking the appropriate key-lever A the same as in adding. To this end there is a transverse hammer-carrying shaft S across the rear of the machine, supported in bearings thereon and adapted to be rotated. The hammer H² is rigid on shaft S, and the hammer H' is fixed on a sleeve h' to turn on said shaft. This shaft is operated from a counter-shaft S' across the bottom and rear of the machine, substantially beneath the shaft S and controlled or operated from key-levers A through a series of parts, as will now be seen. Thus the key-levers, one and all, are adapted to depress the rocking frame T at the front, Fig. 11, which has a curved arm 13 bearing against the end of rod V, which has an axial movement in supports v and has a spring V' to keep it in normal position. Said rod carries a sliding right-angled shoe W, which is provided with a guide v² above rod V and has a shoulder or cross-rib v³ on its top and edge engaged by an arm s' on rock-shaft S', above described, and having a downward projection to ride up and down upon said cross-rib. On the opposite side of said shaft is an arm s², which bears on a spring s³ in a suitable housing and is strong enough to rotarily actuate shaft S' and give the requisite accentuation to the hammers H' and H². When a key-lever is depressed, it throws shoe W out from beneath arms s', and then shaft S' is free to be turned the requisite distance to operate one of the hammers under the tension and power of spring s³. The moment a key-lever is released all the parts resume normal position ready for another movement.

From shaft S' extend two arms s⁴ and s⁵, respectively, Fig. 16, on which are lateral pins 16ᵃ and 17ᵃ, extending inward. Engagement is made with one pin or the other, according as one or the other hammer is to be actuated, and back of all, according to whether numbers or amounts are to be written. To write amounts or add, the movement requires hammer H' fixed on shaft S and is through arm s⁴ and connecting-link 16, and to write numbers the movement is through sleeve h', Fig. 16, and link 17. Each of said links is pivotally connected at its top with shaft S or sleeve h', as the case may be, and is slotted on guide-rod R beneath, by which it is also operated. To this end the said rod is reduced at its engagement in slots r, so as to form shoulders at each side, and thus positively carry said links laterally when the rod is moved axially. Such axial movement is effected through bell-crank lever 18, link 19, and compound lever 20, pivoted in the main frame and having link 19 connected with one end thereof and finger f⁴ (shown in Fig. 3) bearing on the other and inner end, Figs. 2 and 16. The finger f⁴ is on the rear end of rock-shaft f², and hence the line of mechanism just described and leading back to shaft R causes said shaft to be moved axially to the right, Fig. 16, and throws the link 17 into engagement with pin 17ᵃ in hole h⁴ in the bottom of the link. The front lever N will be understood as depressed and held down by arm O as this occurs. By the same operation link 16 is disconnected in its hole h⁵ from pin 16ᵃ, and when one link is in engagement the other is out. In the adding operations the link 16 engages, and this may be said to be normal connection. Rod R slides in suitable supports r² on base B. When the adding mechanism is coupled up, the numbering mechanism is not only thrown out through rear rod R, but a special catch 22 engages in the slot of link 17 beneath rod R and prevents the vertical movement of said link.

The type plate or bar 24 has a row of type 25 for numbering purposes and another row 26 for adding purposes, and the latter are on a plane above the former equal to the space between two cross-rows of figures, because the paper feeds upward over these figures, and after a number has been written and the value thereof is to be stated in the next column the machine feeds the paper along to bring both items in the same horizontal line, as in Fig. 19. The sweep or travel of the type plate or bar 24 is in proportion to the column to be written in, whether units, tens, hundreds, or higher, and is the same as to each row of figures 25 and 26. Said plate 24 is supported and adapted to slide in a suitable guideway in the framework of the machine and is actuated primarily by or through key-levers A, the rocking plate or way d, the shaft d' thereof, and a segmental rack d⁴ on one end thereof engaging a rack-arm 27 on vertical rack-shaft 28. A long arm 30, fixed on the top of this shaft, has a link 31, connecting it with the type plate or bar 24, and a retracting-spring 32, engaging a side arm 33 on shaft 28, pulls it back to starting position after each rotation, and thus also restores type-plate 24 to zero.

It is desirable for the perfect operation of the machine that the key-levers should be depressed their full depth and rise their full height with each actuation, so as to obtain a full movement each way before an opposite movement can be made at all. To this end I provide each key-lever with a vertically-inclined tooth or projection 35 on its side, Figs. 12 to 18, adapted to be engaged by a toothed hanger 36, pivoted from its top within the casing at the front of the machine and spring-pressed on opposite sides below its pivot to hold it normally in a vertical position. The teeth on the opposite edges of the said hanger are reversely inclined and are in such relation to lever A that if the lever be depressed part way the hanger will engage tooth 35 and prevent the lever from being raised without completing the downward movement and getting release in that direction. This involves the clearing of the hanger by depressing the lever beneath the same and giving the hanger a chance to swing to normal position over tooth 35 on the other side, in which case the disposition of the teeth is such that the lever can ride over the upwardly-inclined teeth on that side and find its place unobstructed. The further plan is that a full stroke of any and all the key-levers must be made before another lever can operate, and the machine is locked against all operation until a key has done its complete work and a corresponding imprint has been made on the paper at the rear. Locking mechanism for the said levers is provided, as seen partially in Figs. 6 and 7, wherein a series of short plates 40 are shown arranged edge to edge across the machine within the front portion thereof beneath the levers A and having their upper corners cut away on an angle, so as to form substantially V-shape spaces between adjacent plates directly beneath the said levers. These plates together have only enough space between their edges to accommodate a single key-lever, and when one such lever is depressed all the others are effectually locked against depression. Such lever must therefore rise and get out of the way before another can be used, and this idea is illustrated in Fig. 7. This compels clean and complete work, but does not delay or obstruct the operations, because said plates 40 are very light and easily yield when a lever is depressed.

The escapement mechanism for the carriage is substantially the same as shown in Letters Patent of the United States in my name April 26, 1904, No. 758,052, and therefore need not be entered into especially in this case. Generally it comprises a shaft 41, initially actuated by the key-levers and carrying a segmental ratchet 42, engaged successively by two escapement-pawls 43 and 44 on vertical rocker-post 45. Pawl 44 is rigid on post 45' and pawl 43 pivoted thereon. Normally pawl 44 engages segment 42, and when a key is depressed post 44 rocks and pawl 43 comes into place of pawl 44, but only permitting one tooth to escape on ratchet 42. This gives a step-by-step feed to the parts. Certain parts intervene between post 45 and the key-levers to get these results, which are not described here because they appear in the above Letters Patent and have the same construction and operation in both cases. The arm 47 is the immediate portion to which the rocking power is applied. Fig. 17 also shows two differential drums 50 and 51, over which run two metal belts 52 and 53, of which the belt 52 is fixed to carriage J, and a coiled spring in drum 50' feeds the carriage. The belt 53 over the larger diameters of said drums is engaged with an arm 56, Fig. 5, made rigid with transversely-arranged and slidable bar 57, which carries an arm 58, which engages the hub of selector-wheel G, Fig. 3, and determines its position on shaft $f$.

What I claim is—

1. In a combined numbering and adding machine, mechanism adapted to record numbers and mechanism adapted to add, a paper-carrier, and separate selector mechanism for said carrier adapted to change the operation of said recording mechanism and said adding mechanism, respectively, according as either said recording mechanism or said adding mechanism is chosen.

2. In a combined numbering and adding machine, number-recording mechanism, adding mechanism and means to record the total, key-lever mechanism adapted to operate both said number-recording mechanism and said adding mechanism alternately, and selector devices for said recording mechanism and said adding mechanism respectively.

3. In a combined numbering and adding machine, mechanism adapted to record and mechanism adapted to add, separate selector members for each of said mechanisms, and means operatively connected with the said selector members for the numbering mechanism adapted to disconnect the adding mechanism.

4. In a combined numbering and adding machine, separate numbering and adding mechanisms adapted to record separate items, separate selector-keys for each of said mechanisms, and means operatively connected with the number selector-keys to throw the adding mechanism into and out of operation.

5. In a combined numbering and adding machine, separate mechanisms for numbering and adding and separate selector-keys for each of said mechanisms, and a single carriage in actuating relation with both said mechanisms.

6. In a combined numbering and adding machine, a mechanism to write numbers and a mechanism adapted to add, in combination with a separate printing-hammer for each mechanism and separate selectors for said mechanisms and a set of key-levers common to both.

7. In a combined numbering and adding machine, a mechanism for numbering and a mechanism for adding comprising combined adding and printing wheels, means to change the machine from adding to numbering and numbering to adding, a separate printing-hammer for each mechanism and a single set of key-levers adapted to be used with both.

8. In a combined numbering and adding machine, a mechanism to write numbers and another mechanism to add comprising adding-wheels capable of printing, and a separate hammer for each mechanism, in combination with a carriage and means connected therewith to change from one mechanism to the other and a single set of key-levers adapted to be used with both mechanisms.

9. A combined numbering and adding machine comprising one mechanism for numbering and another for adding, in combination with a type-carrier having separate lines of characters for each mechanism and a separate hammer for each line of characters.

10. A combined numbering and adding machine constructed to both write numbers and to add and having a type-carrier provided with characters for each use, in combination with a separate hammer for each line of characters, a single carriage, and means connected therewith to throw one hammer out and the other in operative relations, and a single set of key-levers adapted to be used for both purposes.

11. A combined numbering and adding machine, comprising a carriage and two separate sets of selector-keys mounted thereon, a type-carrier having separate lines of type, a plurality of hammers to strike the impressions from said type, a single set of key-levers, and mechanism operatively connecting the same with said hammers successively according as one or the other has been selected.

12. In a combined numbering and adding machine, a carriage and two sets of selectors thereon, separate numbering and adding mechanisms operatively connected with said carriage, a hammer at the rear of the machine for each mechanism, and a single set of key-levers operatively connected with both said mechanisms and said hammers as one or the other has been selected.

13. In a combined numbering and adding machine, a type-plate and two separate impression-hammers, a carriage and key-levers operatively connected therewith and means to throw said key-levers into operating connection with either of the said hammers.

14. In a combined numbering and adding machine, a type-plate having rows of type on different horizontal planes, in combination with a hammer for each row, a single series of key-levers and means to operatively disconnect with one hammer and to operatively connect with the other successively.

15. In a combined numbering and adding machine, mechanism for numbering comprising a carriage, a set of selector-keys thereon to determine the column in which the writing shall begin, key-levers to actuate said carriage, a sliding type-plate and means operatively connecting said plate with said key-levers, an impression-hammer opposite said plate, and means operatively connecting the same with said levers, a carriage and means connected therewith to automatically throw said hammer out of action.

16. In a combined numbering and adding machine, a carriage and selector-keys thereon to determine the column in which adding shall begin, a hammer and a series of key-levers to actuate the same and a type-plate and means to move said plate operatively connected with said key-levers, a set of selector-keys on said carriage and mechanism operatively connected therewith to throw said hammer out of action.

17. A combined numbering and adding machine comprising a single carriage and a single set of key-levers, two series of selector-keys and mechanism between each set of said keys and said carriage to limit the machine to numbering or adding, according as a key in one series or the other has been actuated.

In testimony whereof I sign this specification in the presence of two witnesses.

ADOLPHUS S. DENNIS.

Witnesses:
R. B. MOSER,
C. A. SELL.